United States Patent
Iwai

(10) Patent No.: US 9,527,442 B2
(45) Date of Patent: Dec. 27, 2016

(54) DRIVER DANGEROUS DRIVING REPORTING DEVICE

(71) Applicant: Honda Access Corp., Niiza-shi, Saitama (JP)

(72) Inventor: Shiro Iwai, Niiza (JP)

(73) Assignee: HONDA ACCESS CORP., Niiza-shi (JP)

( * ) Notice: Subject to any disclaimer, the term of this patent is extended or adjusted under 35 U.S.C. 154(b) by 0 days.

(21) Appl. No.: 14/443,269

(22) PCT Filed: Jul. 3, 2013

(86) PCT No.: PCT/JP2013/068236
§ 371 (c)(1),
(2) Date: May 15, 2015

(87) PCT Pub. No.: WO2014/083879
PCT Pub. Date: Jun. 5, 2014

(65) Prior Publication Data
US 2015/0291093 A1    Oct. 15, 2015

(30) Foreign Application Priority Data

Nov. 29, 2012    (JP) .................. 2012-261513

(51) Int. Cl.
*G08G 1/123* (2006.01)
*B60Q 9/00* (2006.01)
(Continued)

(52) U.S. Cl.
CPC ............. *B60Q 9/008* (2013.01); *B60K 35/00* (2013.01); *B60R 1/00* (2013.01); *G01C 21/26* (2013.01);
(Continued)

(58) Field of Classification Search
CPC ................................. H04W 4/00; G01C 1/00
See application file for complete search history.

(56) References Cited

U.S. PATENT DOCUMENTS

2011/0317015 A1* 12/2011 Seto .................. B60R 1/00
348/148
2012/0242505 A1* 9/2012 Maeda ................ G08G 1/164
340/905

FOREIGN PATENT DOCUMENTS

JP    2007-253705 A    10/2007
JP    4275507 B2    6/2009
(Continued)

OTHER PUBLICATIONS

International Search Report dated Aug. 20, 2013, issued in corresponding application No. PCT/JP2013/068236.
(Continued)

Primary Examiner — Shirley Lu
(74) Attorney, Agent, or Firm — Westerman, Hattori, Daniels & Adrian, LLP

(57) ABSTRACT

A driver dangerous driving reporting device (100) is provided with a danger prediction unit (30) and a danger reporting unit (40). The danger predicting unit (30) associates a driver inside a vehicle with a subject outside the vehicle, and on the basis of a single image simultaneously representing the driver (subject outside vehicle), is capable of predicting dangerous driving of the vehicle by the driver. When dangerous driving by the driver is predicted by the danger prediction unit (30), the danger reporting unit (40) is capable of reporting the dangerous driving by the driver to the driver.

4 Claims, 3 Drawing Sheets

(51) Int. Cl.
    *G01C 21/36*     (2006.01)
    *G08G 1/16*     (2006.01)
    *B60K 35/00*     (2006.01)
    *B60R 1/00*     (2006.01)
    *G01C 21/26*     (2006.01)
    *G06K 9/00*     (2006.01)
    *H04W 4/00*     (2009.01)
    *G01C 1/00*     (2006.01)

(52) U.S. Cl.
    CPC ....... *G01C 21/3697* (2013.01); *G06K 9/00791* (2013.01); *G06K 9/00845* (2013.01); *G08G 1/16* (2013.01); *G08G 1/166* (2013.01); *B60K 2350/1076* (2013.01); *B60R 2300/105* (2013.01); *B60R 2300/8006* (2013.01); *B60R 2300/8093* (2013.01); *G01C 1/00* (2013.01); *H04W 4/00* (2013.01); *Y02T 10/84* (2013.01)

(56) References Cited

FOREIGN PATENT DOCUMENTS

| | | |
|---|---|---|
| JP | 2012-047461 A | 3/2012 |
| WO | 2010/050012 A1 | 5/2010 |

OTHER PUBLICATIONS

Notification of Transmittal of Translation of the International Preliminary Report on Patentability (Form PCT/IB/338) issued in counterpart International Application No. PCT/JP2013/068236 dated Jun. 11, 2015, with Forms PCT/IB/373 and PCT/ISA/237 ( 8 pages).

\* cited by examiner (A)

(B)

(A)

(B)

(C)

DRIVER DANGEROUS DRIVING REPORTING DEVICE

TECHNICAL FIELD

The present invention relates to a device for reporting dangerous driving of a vehicle by a driver (a driver dangerous driving reporting device) and, more particularly, to a driver dangerous driving reporting device that uses a vehicle interior image and a vehicle exterior image, which are captured simultaneously, when dangerous driving is predicted.

BACKGROUND ART

Patent Literature 1, for example, discloses a driving assistance device as a driver dangerous driving reporting device. A vehicle interior camera and a driver state determination unit of this driving assistance device capture an image of the driver's head and determine the driver's line of sight, while a vehicle exterior camera and a danger determination unit (a danger direction determination unit) of the driving assistance device capture an image of the host vehicle's periphery and determine a direction relative to the host vehicle that is a danger factor. In Patent Literature 1, an assistance content deciding unit of the driving assistance device decides the content of a warning that reports the presence of a danger factor on the basis of the driver's line of sight (the output from the driver state determination unit) and the direction relative to the host vehicle that is a danger factor (the output from the danger determination unit). Specifically, warnings relating to danger factors outside of the driver's field of view are prioritized over warnings relating to danger factors within the driver's field of view. Thus, the assistance content deciding unit must determine whether or not a danger factor is outside of the driver's field of view.

However, for the assistance content deciding unit to make the determination described above, the output from the driver state determination unit (the vehicle interior image) and the output from the danger determination unit (the vehicle exterior image) must be synchronized, as shall be apparent. In other words, the image of the driver's head captured by the vehicle interior camera (the vehicle interior image) and the image of the host vehicle's periphery captured by the vehicle exterior camera (the vehicle exterior image) must be managed separately.

Because these two images are processed separately by the driver state determination unit and the danger direction determination unit, two directions (the driver's line of sight and the direction relative to the host vehicle that is a danger factor) must be determined and the assistance content deciding unit must determine whether or not the danger factor is outside of the driver's field of view on the basis of these two directions. In other words, a large processing load is involved when deciding the content of the warning that reports the presence of a danger factor.

PRIOR ART LITERATURE

Patent Literature

Patent Literature 1: Japanese Patent Publication No. 4275507 B

SUMMARY OF INVENTION

Technical Problem

It is an object of the present invention to provide a driver dangerous driving reporting device or the like that can reduce the load of the process of predicting dangerous driving. Another object of the present invention will become apparent to those skilled in the art when reference is made to the aspects and preferred embodiment exemplified below, in conjunction with the accompanying drawings.

Solution to Problem

According to the present invention, there is provided a driver dangerous driving reporting device which comprises: a danger prediction unit for associating a driver inside the vehicle with a subject outside a vehicle, and, on the basis of a single image simultaneously representing the driver and the subject, predicting dangerous driving of the vehicle by the driver; and a danger reporting unit for reporting the dangerous driving by the driver to the driver when the dangerous driving is predicted by the danger prediction unit.

In the invention, there is used a single image created by associating the driver inside the vehicle with the subject outside the vehicle, the single image simultaneously representing the driver and the subject. In other words, there is no need to separately process an image representing the driver (a vehicle interior image) and an image representing the subject (a vehicle exterior image). In the present invention, a single image can be processed all at once, and the processing load on the danger prediction unit when dangerous driving is predicted can therefore be reduced.

In one form of the invention, the danger prediction unit has a driver's field of view detection unit for detecting line of sight and/or facial orientation of the driver within the single image, and a danger factor detection unit for detecting a danger factor within the single image.

In another form of the invention, the driver's field of view can be detected on the basis of the driver's line of sight and/or facial orientation, and danger factors within the single image can also be detected. Through these detections, the danger prediction unit can predict dangerous driving of the vehicle by the driver (e.g., that the driver is not focusing on a traffic signal, or the driver is getting tired).

Particularly, when, e.g., an assessment is made as to whether or not a danger factor is outside the driver's field of view, it is enough to merely assess whether or not the driver's line of sight and/or facial orientation indicates a danger factor within the single image. In other words, it is possible to determine whether or not a danger factor is outside of the driver's field of view directly from the driver's line of sight and/or facial orientation, without needing to detect the direction relative to a vehicle that is a danger factor. It is therefore possible to further reduce the processing load of the danger prediction unit when dangerous driving of the vehicle by the driver is predicted.

In a further form of the invention, the driver dangerous driving reporting device further comprises a simultaneous imaging unit for capturing the single image.

In this form, because the device comprises a simultaneous imaging unit for capturing the single image, there is no need to synchronize the image representing the driver (the vehicle interior image) and the image representing the subject (the vehicle exterior image). In other words, because only a single image is created, the single image is easily managed.

In a still further form of the invention, the simultaneous imaging unit has an optical system for associating the driver and the subject, and a single imaging element for simultaneously imaging the driver and the subject via the optical system.

In this form, the driver and the subject can be brought together within the single image by the optical system (e.g., a refraction unit), and the two can be associated.

In a still further form of the invention, the driver dangerous driving reporting device further comprises a danger-predicted location storage unit for storing the position of the vehicle corresponding to the dangerous driving when the dangerous driving is predicted by the danger prediction unit, and a map information display unit for displaying the position within the map information along with the map information.

The driver can see a past history representing dangerous driving by looking at the map information display unit. In other words, when the driver intends to drive the vehicle a second time along the same route, the driver can drive safely the second time by knowing past dangerous positions in the map information in advance.

A person skilled in the art could easily understand that the exemplified aspects of the present invention could be further changed without deviating from the spirit of the present invention.

DESCRIPTION OF EMBODIMENTS

A preferred embodiment described below is used to make the present invention easy to understand. Therefore, a person skilled in the art should be mindful that the present invention is not unreasonably limited by the embodiment described below.

Figure 1:
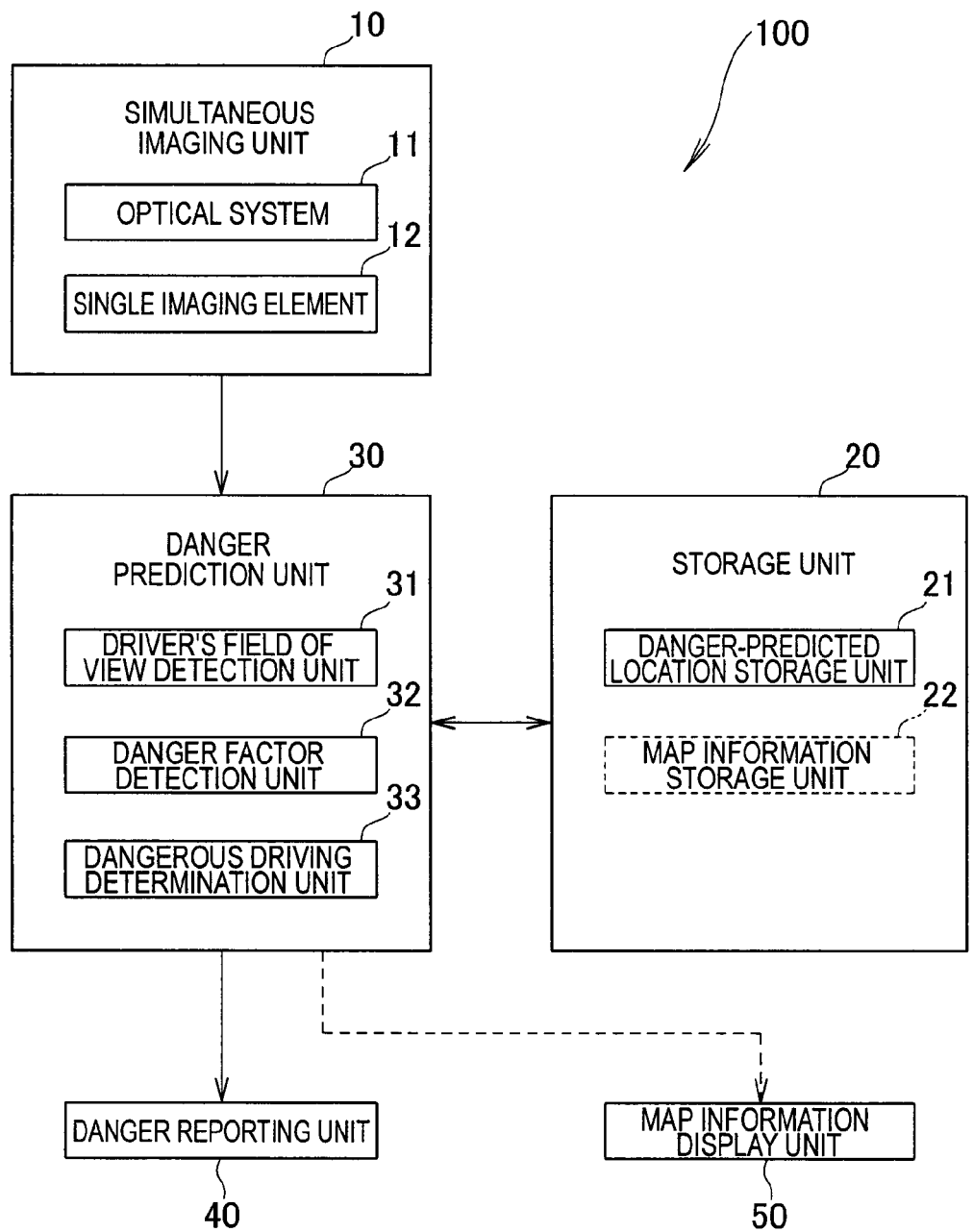
FIG. 1 is a block diagram illustrating an example configuration of a driver dangerous driving reporting device according to the present invention.

Referring to FIG. 1, the driver dangerous driving reporting device 100 of the present invention includes a danger prediction unit 30 and a danger reporting unit 40. The danger prediction unit 30 associates a driver inside the vehicle with a subject outside the vehicle, and on the basis of a single image simultaneously representing the driver (the subject inside the vehicle) and the subject (the subject outside the vehicle), is capable of predicting dangerous driving of the vehicle by the driver. When dangerous driving by the driver is predicted by the danger prediction unit 30, the danger reporting unit 40 is capable of reporting the dangerous driving by the driver to the driver.

The driver dangerous driving reporting device 100 can further include, e.g., a simultaneous imaging unit 10. The simultaneous imaging unit 10 can capture a single image simultaneously representing the driver (the subject inside the vehicle) and the subject (the subject outside the vehicle). When the driver dangerous driving reporting device 100 does not include a simultaneous imaging unit 10 for capturing a single image, or in other words, when the driver dangerous driving reporting device 100 includes, e.g., a first imaging unit (not shown) and a second imaging unit (not shown), the danger prediction unit 30 may input a single image created by combining an image representing the driver (the vehicle interior image) and an image representing the subject (the vehicle exterior image).

The danger prediction unit 30 does not need to separately process the image representing the driver (the vehicle interior image) and the image representing the subject (the vehicle exterior image). In other words, because the danger prediction unit 30 is capable of processing one image at a time, it is possible to reduce the processing load of the danger prediction unit 30 predicting dangerous driving by the driver. When the driver dangerous driving reporting device 100 includes a simultaneous imaging unit 10 which captures a single image, the danger prediction unit 30 does not need to synchronize image representing the driver (the vehicle interior image) and the image representing the subject (the vehicle exterior image). In other words, because only a single image is created by the simultaneous imaging unit 10, the danger prediction unit 30 preferably manages only a single image rather than both the vehicle interior image and the vehicle exterior image, and the single image is therefore easily managed.

The simultaneous imaging unit 10 is configured from, e.g., an optical system 11 and a single imaging element 12, and the single imaging element 12 can simultaneous image the driver (the subject inside the vehicle) and the subject (the subject outside the vehicle) via the optical system 11. The optical system 11 can bring together the subject inside the vehicle and the subject outside the vehicle within the single imaging element 12, and can associate the both the subject inside the vehicle and the subject outside the vehicle. The optical system 11 has, e.g., a lens and a prism and can be configured from a refracting part, and the single imaging element 12 has, e.g., a complementary metal oxide semiconductor (CMOS) image sensor and can be configured from an image sensor unit. The single imaging element 12 can further have processing mechanisms such as a correlated double sampling (CDS) and an analog-to-digital (A/D) converter, and can output single images (image signals) in digital format.

Figure 2:
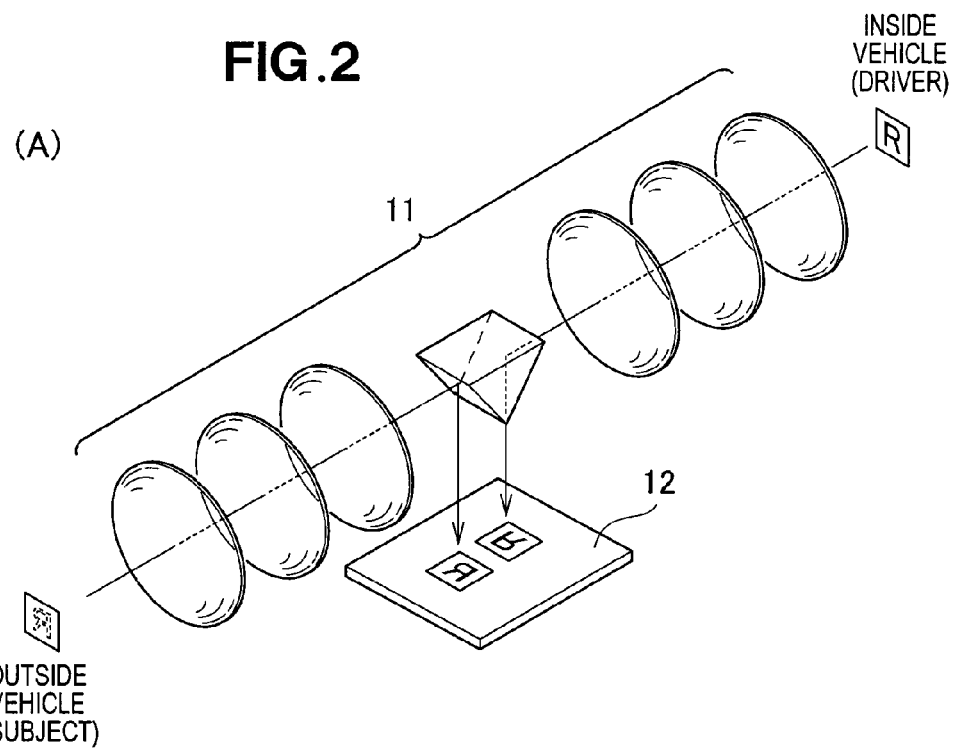
FIG. 2(A) illustrates an example configuration of an optical system of FIG. 1, whilst
FIG. 2(B) illustrates a composition example of a single image created by a simultaneous imaging unit of FIG. 1.
Figure 2:
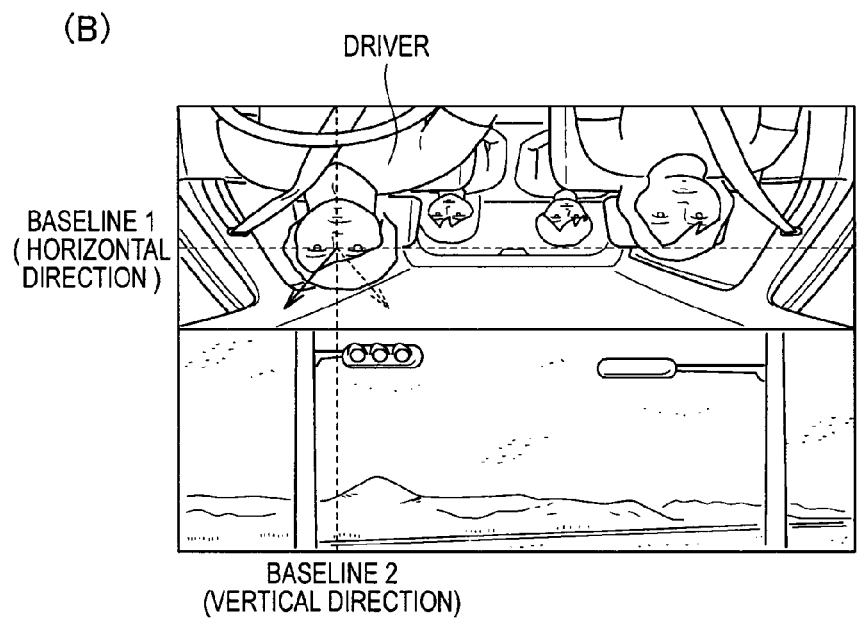

Referring to FIG. 2(A), a pair of schematic optical paths are shown, and the optical system 11 has, e.g., a pair of refracting parts (e.g., six lenses and one triangular prism). One of the pair of refracting parts (e.g., the three right-side lenses and the right half of the one triangular prism) refracts light from the driver (the subject inside the vehicle) by, e.g., 90 degrees and creates a projection image (vehicle interior projection image) within the single imaging element 12. The other of the pair of refracting parts (e.g., the three left-side lenses and the left half of the one triangular prism) refracts light from the subject (the subject outside the vehicle) by, e.g., 90 degrees and creates a projection image (vehicle exterior projection image) within the single imaging element 12. Both of the pair of schematic optical paths are refracted at one point in a right angle, but may actually be refracted gradually at multiple points in a curve.

As shown in FIG. 2(B), the top side of the single image corresponds to the subject inside the vehicle including the driver. The bottom side of the single image corresponds to the subject outside the vehicle including, e.g., a traffic signal as a subject. The bottom side of the single image is an image resulting when a second imaging unit (not shown) configured from, e.g., a normal camera is installed inside the vehicle and the camera lens is directed from the vehicle interior to the vehicle exterior, or in other words, a composition of the driver's view of the vehicle exterior. In FIG. 2(B), with the driver's view of the vehicle exterior (through, e.g., the windshield or the like) as a reference, a traffic signal is located in front and on the left side of the vehicle, and the traffic signal has three signal lights including, e.g., green, yellow, and red. Another traffic signal is located in front and on the right side of the vehicle, and the, e.g., three signal lights of this other traffic signal are obscured from view.

The top side of the single image is a vertical inversion of an image resulting when a first imaging unit (not shown) configured from, e.g., an ordinary camera is installed inside the vehicle and the camera lens is directed from the vehicle exterior to the vehicle interior; i.e., a composition of the driver's upside-down view of the vehicle interior. In the example of FIG. 2(B) (real space), with the driver's view of the vehicle exterior (through, e.g., the windshield or the like) as a reference, a driver is located in the right-side seat (the driver seat) inside the vehicle and this driver is facing in the opposite direction of the left-side seat (the passenger seat) inside the vehicle (in the direction of the solid-line arrow in FIG. 2(B)). Specifically, in the example of FIG. 2(B) (a single image), with a front view of the single image as a reference, the driver is located on the left side of the single image, and the driver in this single image is facing the opposite direction of the right side of the single image (the direction of the solid-line arrow in FIG. 2(B)).

When, e.g., a driver is driving the vehicle and the vehicle is moving forward, and in a case in which a traffic signal is located in real space in front of and on the left side of the vehicle, the driver must focus on the three traffic lights including, e.g., green, yellow, and red, and the driver must therefore assess which of the colors green, yellow, and red the traffic signal is showing. In other words, the driver must face toward the left-side seat (the passenger seat) in real space inside the vehicle, and the driver in the single image must therefore face the right side of the single image (the direction of the dashed-line arrow in FIG. 2(B)). Thus, the driver's situation and the road environment in the vehicle periphery can be perceived by analyzing a single image simultaneously representing the driver (the subject inside the vehicle) and the subject (the subject outside the vehicle), and the danger prediction unit 30 can therefore predict dangerous driving of the vehicle by the driver (e.g., that the driver is not focusing on the traffic signal).

The simultaneous imaging unit 10 shown in FIG. 1 is typically located in, e.g., an instrument panel (not shown) inside the vehicle, and the simultaneous imaging unit 10 is capable of simultaneously imaging the driver (the subject inside the vehicle) and the road environment such as, e.g., a traffic signal or the road in front of the vehicle (subjects outside the vehicle). The simultaneous imaging unit 10 may further include, e.g., an illumination unit (not shown) capable of using near infrared rays to illuminate the pupils of the driver at night, a zoom lens (not shown) capable of adjusting focal point distance, a diaphragm mechanism (not shown) capable of adjusting light quantity, and the like. The illumination unit, zoom lens, diaphragm mechanism, and the like of the simultaneous imaging unit 10 would be controlled by, e.g., the danger prediction unit 30.

Referring to FIG. 1, the danger prediction unit 30 includes a driver's field of view detection unit 31 for detecting the driver's line of sight and/or facial orientation within a single image, and a danger factor detection unit 32 for detecting danger factors (e.g., a traffic signal) within a single image. The danger prediction unit 30 is configured from processing units such as, e.g., an application specific IC (ASIC) and a microcomputer, and single images (image signals) in, e.g., a digital format are managed in a working area or a storage unit 20 of the danger prediction unit 30. The driver's field of view detection unit 31 reads the single images and extracts characteristic points representing facial organs of the driver such as, e.g., the pupils within, e.g., the upper right area in the single images. Specifically, the driver's field of view detection unit 31 can recognize, e.g., the driver's left and right pupils and detect the driver's line of sight. Furthermore, the driver's field of view detection unit 31 can recognize, e.g., the driver's left and right eyes, nose, and mouth and detect the orientation of the driver's face.

Another possible option is for the driver's characteristic points to be registered in advance and for only the registered driver to be detected. Yet another possible option is for characteristic points such as the steering wheel to be registered in advance and for only a vehicle occupant near the driver seat to be detected.

The danger factor detection unit 32 extracts characteristic points representing danger factors such as traffic signals, pedestrians (not shown), oncoming vehicles (not shown), and tunnels in, e.g., the lower area within the single images. Specifically, the danger factor detection unit 32 can recognize, e.g., changes from green to yellow in traffic signals. The danger factor detection unit 32 can also recognize, e.g., red lights of traffic signals. Similarly, the danger factor detection unit 32 can recognize, e.g., the sudden appearance of pedestrians.

Thus, the danger prediction unit 30 can detect the driver's field of view on the basis of the driver's line of sight and/or facial orientation, and can detect danger factors within a single image. Through these detections, the danger prediction unit 30 can predict dangerous driving of the vehicle by the driver (e.g., that the driver is not focusing on danger factors such as traffic signals, pedestrians, oncoming vehicles, and tunnels). Additionally, even if the driver does focus on a danger factor, when the reaction time until the driver focuses on the danger factor is slower than a predetermined reaction time, the danger prediction unit 30 can predict dangerous driving of the vehicle by the driver (e.g., that the driver is getting tired).

Additionally, the driver's field of view detection unit 31 can detect the movement of the driver's left and/or right pupil (the rate of change in the size of the pupil). The danger factor detection unit 32 can detect the rate of change in the amount of outside light around the vehicle periphery, such as when, e.g., the vehicle is entering a tunnel or exiting a tunnel. For example, when the rate of change in the amount of outside light is greater than a predetermined value (an outside light predetermined value) and the rate of change in the size of the pupils is less than a predetermined value (a pupil predetermined value), i.e. the pupil movement is slow, the danger prediction unit 30 can predict dangerous driving of the vehicle by the driver (e.g., that the driver is getting tired and not concentrating on driving the vehicle).

When the illumination unit of the simultaneous imaging unit 10 irradiates the driver's pupils with near-infrared rays, the driver's field of view detection unit 31 more accurately detects not only the driver's line of sight, but also the movement of the, e.g., driver's left and/or right pupil.

As shown in FIG. 2(B), when a determination is made as to whether or not a danger factor is outside the driver's field of view, it is enough to merely assess whether or not the driver's line of sight and/or facial orientation indicates a danger factor within the single image. Specifically, straight lines within the single image, one horizontal and one vertical and both centered on the, e.g., driver's left and right eyes, are set as baselines 1 and 2 respectively, and the single image is divided into, e.g., four parts by the baselines 1 and 2. The solid-line arrow direction (the driver's line of sight and/or facial orientation) in the single image in FIG. 2(B) corresponds to, e.g., the bottom left image, while the, e.g., three traffic lights (danger factors) in the single image in FIG. 2(B) correspond to, e.g., the bottom right image. Thus, when, e.g., the driver's line of sight and/or facial orientation does not indicate a danger factor within the single image, the danger factor is outside of the driver's field of view; therefore, it can be assessed that, e.g., the driver is not focusing on the traffic signal which has three traffic lights (dangerous driving of the vehicle by the driver).

Alternatively, the dashed line arrow direction (the driver's line of sight and/or facial orientation) in the single image in FIG. 2(B) corresponds to, e.g., the bottom right image, while the, e.g., three traffic lights (danger factors) in the single image in FIG. 2(B) correspond to, e.g., the bottom right image. Thus, when, e.g., the driver's line of sight and/or facial orientation does indicate a danger factor within the single image, the danger factor is not outside of the driver's field of view; therefore, it can be assessed that, e.g., the driver is focusing on the traffic signal which has three traffic lights (safe driving of the vehicle by the driver).

Thus, the danger prediction unit 30 or a dangerous driving determination unit 33 shown in FIG. 1 can assess whether or not a danger factor is outside of the driver's field of view (whether or not the vehicle is being driven dangerously by the driver) directly from the driver's line of sight and/or facial orientation in the single image, without needing to detect the direction relative to a vehicle that is a danger factor in real space. It is therefore possible to further reduce the processing load of the danger prediction unit 30 or the dangerous driving determination unit 33 when dangerous driving of the vehicle by the driver is predicted.

As shown in FIG. 1, the driver dangerous driving reporting device 100 further includes, e.g., a danger-predicted location storage unit 21. When dangerous driving is predicted by the danger prediction unit 30 or the dangerous driving determination unit 33, the danger-predicted location storage unit 21 can store the position of the vehicle corresponding to the dangerous driving. The position of the vehicle can be measured by, e.g., a global positioning system (GPS) receiver (not shown), and the dangerous driving determination unit 33 can receive the position of the vehicle when the dangerous driving of the vehicle by the driver was predicted on the basis of the single image from, e.g., the GPS receiver.

The danger-predicted location storage unit 21 may store not only the position of the vehicle, but also the time, altitude, acceleration, single image, and other factors when the dangerous driving of the vehicle by the driver was predicted. The storage unit 20 may also have not only the danger-predicted location storage unit 21, but also a map information storage unit 22 for storing map information. Additionally, the storage unit 20 can store a program for actualizing the danger prediction unit 30, a program for replicating the position of the vehicle when the dangerous driving of the vehicle was predicted, a program for navigating a route to the destination, and the like.

As shown in FIG. 1, the driver dangerous driving reporting device 100 can further include, e.g., a map information display unit 50. The map information display unit 50 herein can display the position of the vehicle when the dangerous driving of the vehicle was predicted that is contained in the map information stored in the danger-predicted location storage unit 21, along with the map information stored in the map information storage unit 22.

The storage unit 20 is configured from, e.g., a hard disk drive (HDD), a flash memory, and the like. The danger reporting unit 40 can be configured from, e.g., a speaker, a warning light, and the like. The map information display unit 50 is configured from, e.g., a display and the like.

Figure 3:
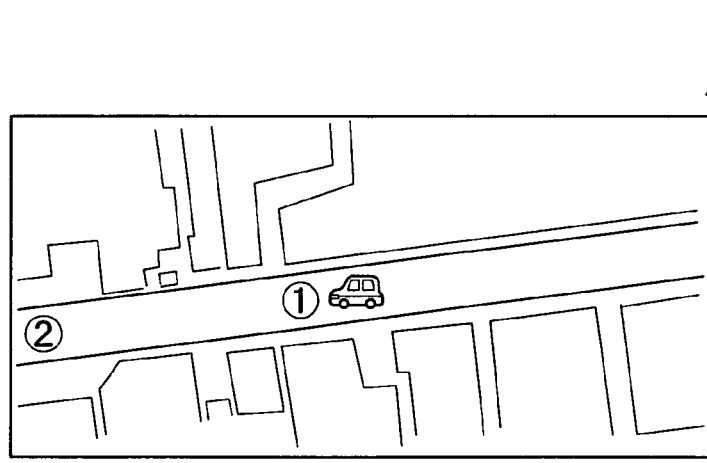
FIG. 3(A) shows a display example of the map information display unit of FIG. 1, whilst
FIGS. 3(B) and 3(C) show display examples in a modification (display unit) of the map information display unit of FIG. 1.
Figure 3:
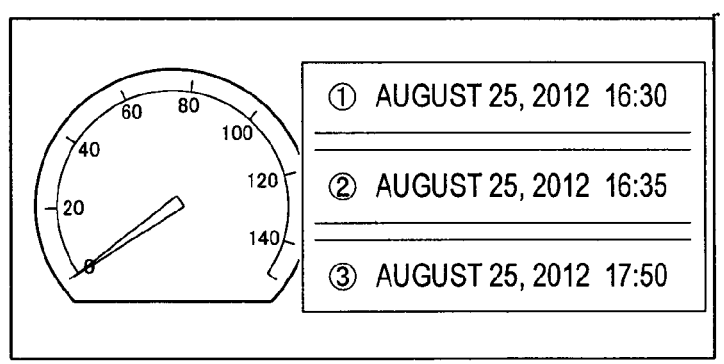
Figure 3:
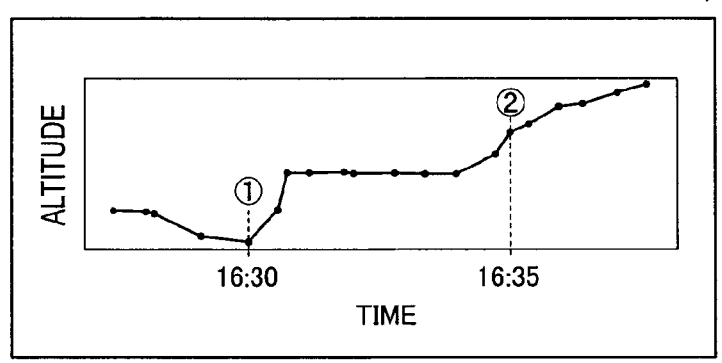

FIG. 3(A) shows a display example of the map information display unit 50 of FIG. 1, and FIGS. 3(B) and 3(C) each show a display example in a modification (display unit 50a) of the map information display unit 50 of FIG. 1. As shown in FIG. 3(A), the map information display unit 50 can display, along with the map information, positions of the vehicle ((1) and (2) in FIG. 3(A)) when dangerous driving of the vehicle in the map information was predicted. The driver can see a past history representing dangerous driving by looking at the map information display unit 50. In other words, when the driver intends to drive the vehicle a second time along the same route, the driver can drive safely the second time by knowing past dangerous positions in the map information in advance.

The danger-predicted location storage unit 21 may store not only the position of the vehicle, but also, e.g., the single image when dangerous driving of the vehicle by the driver was predicted. The single image may be a still image or a moving image. When the danger-predicted location storage unit 21 stores a moving image, the danger prediction unit 30 or a processing unit can fast-forward the moving image at, e.g., ten times the speed. Moving images can be stored while the vehicle is being driven, and positions of the vehicle can also be stored while the vehicle is being driven. Specifically, as shown in FIG. 3(A), the position of the vehicle (the automobile in FIG. 3(A)) can be drawn, and dangerous positions along past routes ((1) and (2) in FIG. 3(A)) can be shown.

As shown in FIG. 3(B), the map information display unit 50 can display, e.g., a speedometer instead of map information, and can also display, e.g., times ((1), (2), and (3) in FIG. 3(B)) when dangerous driving of the vehicle was predicted. Furthermore, as shown in FIG. 3(C), the map information display unit 50 can display, e.g., altitude instead of map information, and can also display, e.g., times ((1) and (2) in FIG. 3(C)) when dangerous driving of the vehicle was predicted.

The present invention is not limited to the embodiment exemplified above, and a person skilled in the art could easily change the embodiment exemplified above within the range included in the patent claims.

INDUSTRIAL APPLICABILITY

The present invention is suitable in a vehicle in which dangerous driving by a driver can be reported to the driver.

LIST OF REFERENCE SIGNS

10: simultaneous imaging unit, 11: optical system, 12: single imaging element, 20: storage unit, 21: danger-predicted location storage unit, 22: map information storage unit, 30: danger prediction unit, 31: driver's field of view detection unit, 32: danger factor detection unit, 33: dangerous driving determination unit, 40: danger reporting unit, 50: map information display unit, 100: driver dangerous driving reporting device.

The invention claimed is:

1. A driver dangerous driving reporting device comprising:
   a danger prediction unit for associating a driver inside a vehicle with a subject outside the vehicle, and, on the basis of a single image simultaneously representing the driver and the subject, predicting dangerous driving of the vehicle by the driver; and
   a danger reporting unit for reporting the dangerous driving by the driver to the driver when the dangerous driving is predicted by the danger prediction unit,
   wherein either a view inside the vehicle including the driver or a view outside the vehicle including the subject appears in a top side or a bottom side of the single image, with one of the view inside the vehicle and the view outside the vehicle provided as a vertical inversion of the other view in the single image,
   the danger prediction unit comprises:
   a driver's field of view detection unit for detecting line of sight and/or facial orientation of the driver within one of the top side and the bottom side of the single image, and
   a danger factor detection unit for detecting a danger factor within the other one of the top side and the bottom side of the single image,
   the danger prediction unit is configured to judge whether the danger factor is positioned outside the drivers field of view depending on whether the line of sight and/or facial orientation of the driver is directed to the danger factor within the single image, for predicting the dangerous driving of the vehicle.

2. The driver dangerous driving reporting device of claim 1, wherein the driver dangerous driving reporting device further comprises:
   a simultaneous imaging unit for capturing the single image.

3. The driver dangerous driving reporting device of claim 2, wherein the simultaneous imaging unit includes:
   an optical system for associating the driver and the subject; and
   a single imaging element for simultaneously imaging the driver and the subject via the optical system.

4. The driver dangerous driving reporting device claim 1, further comprising:
   a danger-predicted location storage unit for storing the position of the vehicle corresponding to the dangerous driving when the dangerous driving is predicted by the danger prediction unit; and
   a map information display unit for displaying the position within the map information along with the map information.

* * * * *